(12) United States Patent
Diamond et al.

(10) Patent No.: US 12,187,152 B2
(45) Date of Patent: Jan. 7, 2025

(54) SYSTEMS, METHODS, AND MANUFACUTURES FOR CHARGER SUCCESS RATE AND USAGE MONITORING

(71) Applicant: FORD GLOBAL TECHNOLOGIES, LLC, Dearborn, MI (US)

(72) Inventors: Brendan F. Diamond, Grosse Pointe, MI (US); Keith Weston, Canton, MI (US); Andrew Denis Lewandowski, Sterling Heights, MI (US); Jordan Barrett, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 170 days.

(21) Appl. No.: 17/673,552

(22) Filed: Feb. 16, 2022

(65) Prior Publication Data

US 2023/0256856 A1 Aug. 17, 2023

(51) Int. Cl.
| | |
|---|---|
| *G06Q 30/00* | (2023.01) |
| *B60L 53/65* | (2019.01) |
| *B60L 53/66* | (2019.01) |
| *B60L 53/67* | (2019.01) |
| *B60L 53/68* | (2019.01) |
| *G06Q 30/0601* | (2023.01) |

(52) U.S. Cl.
CPC .............. *B60L 53/66* (2019.02); *B60L 53/65* (2019.02); *B60L 53/67* (2019.02); *B60L 53/68* (2019.02); *G06Q 30/0631* (2013.01)

(58) Field of Classification Search
CPC ...... G06Q 30/0601–0645; G06Q 30/08; B60L 53/65–68

USPC ................................................. 705/26.1–27.2
See application file for complete search history.

(56) References Cited

U.S. PATENT DOCUMENTS

| | | |
|---|---|---|
| 9,026,347 B2 | 5/2015 | Gadh et al. |
| 9,156,368 B2 | 10/2015 | Chen et al. |
| (Continued) | | |

OTHER PUBLICATIONS

Mogg, Trevor "Google Maps now shows EV owners which charging stations are occupied," Apr. 23, 2019, digitalTrends.com, accessed at [https://www.digitaltrends.com/cars/google-maps-is-now-a-lot-more-useful-for-electric-vehicle-owners/] (Year: 2019).*

(Continued)

*Primary Examiner* — Jeffrey A. Smith
*Assistant Examiner* — Lindsey B Smith
(74) *Attorney, Agent, or Firm* — Joseph Zane; BROOKS KUSHMAN P.C.

(57) ABSTRACT

Success rate and usage monitoring for charging vehicles is provided. A charger request is received from a requesting device, the charger request requesting charger recommendations for a vehicle. One or more vehicle attributes are identified from the charger request. The charger recommendations are determined based on charger statistics computed based on charger histories that correspond to the one or more vehicle attributes, the charger histories being descriptive of vehicle charges performed to one or more vehicles by one or more charging stations and further including information descriptive of the one or more vehicles receiving the vehicle charges. The charger recommendations corresponding to the one or more vehicle attributes are sent to the requesting device, responsive to the request.

19 Claims, 5 Drawing Sheets

(56) References Cited

U.S. PATENT DOCUMENTS

| | | | | |
|---|---|---|---|---|
| 2011/0193522 A1* | 8/2011 | Uesugi | .................... | B60L 53/65 |
| | | | | 320/109 |
| 2019/0383637 A1* | 12/2019 | Teske | ...................... | B60L 53/14 |
| 2023/0045214 A1* | 2/2023 | Maeda | .................... | B60L 53/63 |
| 2023/0174041 A1* | 6/2023 | Cronin | ............... | G01C 21/3837 |
| | | | | 701/22 |

OTHER PUBLICATIONS

Gerdes, Justin, Will Your EV Keep the Lights on When the Grid Goes Down?, Nov. 8, 2019, GreenTechMedia.com, accessed at [ https://www.greentechmedia.com/articles/read/will-your-ev-keep-the-lights-on-when-the-grid-goes-down] (Year: 2019).*

PlugShare—EV Charging Station Map—Find a place to charge your car! retrieved from https://www.plugshare.com on Sep. 3, 2021.

ChargeHub—Find every public charging station for electric cars, retrieved from https://chargehub.com/en/charging-stations-map.html on Sep. 3, 2021.

* cited by examiner

SYSTEMS, METHODS, AND MANUFACUTURES FOR CHARGER SUCCESS RATE AND USAGE MONITORING

TECHNICAL FIELD

Aspects of the disclosure relate to charger success rate and usage monitoring for improved charter recommendations and charger filtering.

BACKGROUND

The increased availability of electric vehicles has increased the amount of charging stations that are required for vehicles to use. Charging stations may have different attributes, such as charger plug type, maximum charge speed, charge to use, availability, reliability, and location.

SUMMARY

In one or more illustrative examples, a system for success rate and usage monitoring for charging vehicles is provided. A storage is configured to maintain charger histories descriptive of vehicle charges performed to one or more vehicles by one or more charging stations and further including information descriptive of the one or more vehicles receiving the vehicle charges. A processor is programmed to receive a charger request from a requesting device, the charger request requesting charger recommendations for a vehicle, identify one or more vehicle attributes from the charger request, determine the charger recommendations based on charger statistics computed based on the charger histories that correspond to the one or more vehicle attributes, and send the charger recommendations corresponding to the one or more vehicle attributes to the requesting device, responsive to the request.

In one or more illustrative examples, a method for success rate and usage monitoring for vehicle charging is provided. A charger request is received from a requesting device, the charger request requesting charger recommendations for a vehicle. One or more vehicle attributes are identified from the charger request. The charger recommendations are determined based on charger statistics computed based on charger histories that correspond to the one or more vehicle attributes, the charger histories being descriptive of vehicle charges performed to one or more vehicles by one or more charging stations and further including information descriptive of the one or more vehicles receiving the vehicle charges. The charger recommendations corresponding to the one or more vehicle attributes are sent to the requesting device, responsive to the request.

In one or more illustrative examples, a non-transitory computer-readable medium comprising instructions for success rate and usage monitoring for vehicle charging that, when executed by a processor of a charger monitoring server, cause the charger monitoring server to perform operations including to receive a charger request from a requesting device, the charger request requesting charger recommendations for a vehicle; identify one or more vehicle attributes from the charger request; determine the charger recommendations based on charger statistics computed based on charger histories that correspond to the one or more vehicle attributes, the charger histories being descriptive of vehicle charges performed to one or more vehicles by one or more charging stations and further including information descriptive of the one or more vehicles receiving the vehicle charges; and send the charger recommendations corresponding to the one or more vehicle attributes to the requesting device, responsive to the request

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle charging stations may not always operate within their design specifications. While mobile applications or in-vehicle systems may be used to inform a user where to charge, the suggested charging station may be inoperable, unreliable, or may function better for some models of vehicle than for others. Additionally, some charging stations may operate below the advertised charge rate (e.g., 62.5-125 kW DC Fast Charge may be advertised but the charger historically provides charge at 30 kW).

Mobile applications or in-vehicle systems may provide review information for chargers if a user enters feedback or comments on a charger. However, such information may be time consuming to sort through and may not provide information that is tailored to a specific model of vehicle (e.g., this charger works on a Mach-E but not an Escape plug-in hybrid-electric vehicle (PHEV)) or information that is important for the user (e.g., provides 30 kW but advertises 120 kW). Moreover, ad hoc reviews may not be able to differentiate between issues that are a result of a particular type of vehicle, a particular type of charger, or a particular combination of vehicle and charger.

An improved charger availability approach may include capturing charger histories from vehicles and/or from charging stations, and using that information to determine charger statistics that may be used to improve the user experience. This approach may allow a charter service to determine which chargers are prone to errors, lower than advertised charge rates, and/or other undesirable traits. Charger statistics may be compiled by the charger service to provide charger recommendations to vehicles or mobile devices of vehicle, where the charger recommendations are specific to the model of vehicle, type of charger, or other parameters identified by the charger histories.

Figure 1:
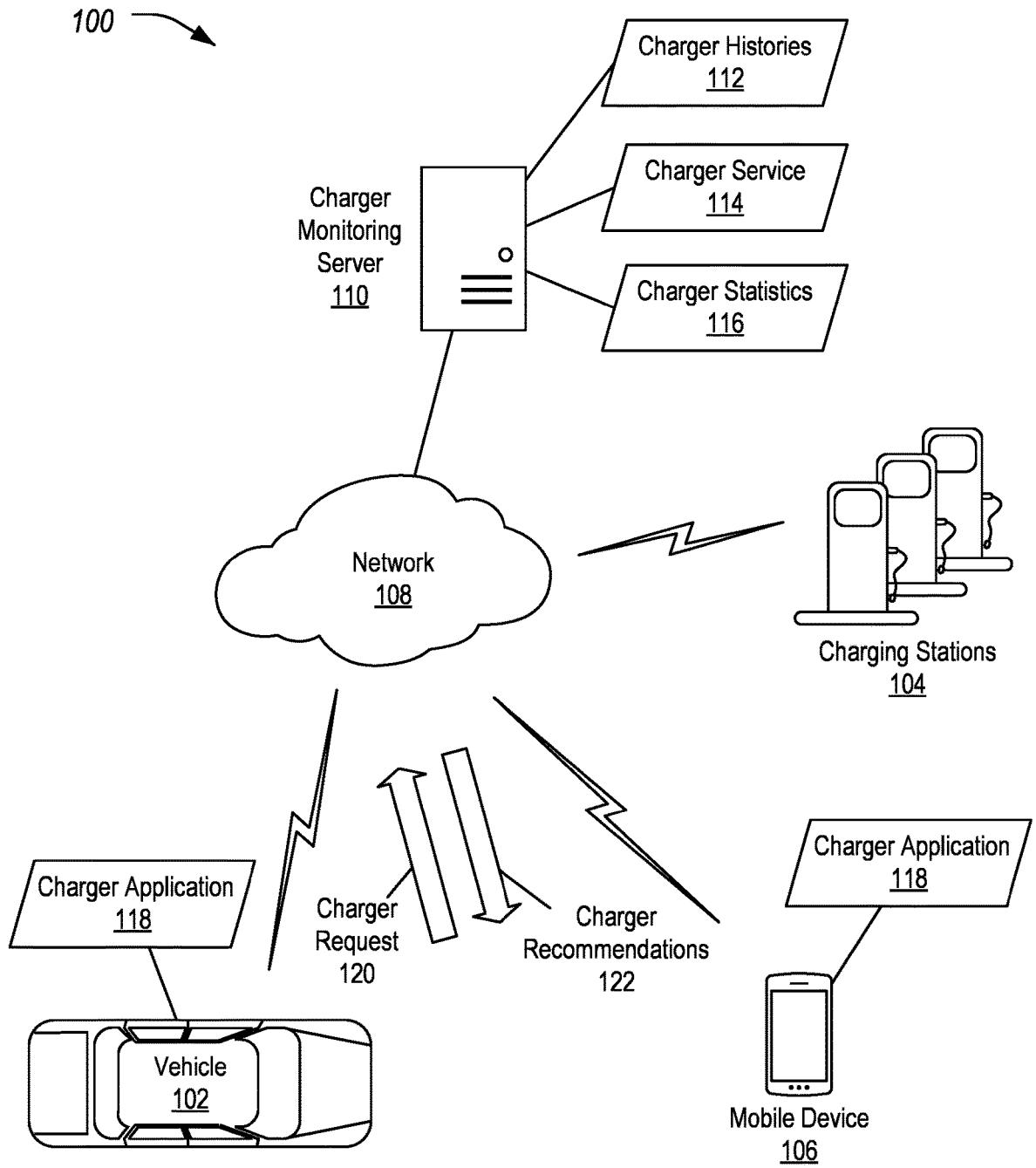
FIG. 1 illustrates an example system for success rate and usage monitoring for charging vehicles.

FIG. 1 illustrates an example system 100 for success rate and usage monitoring for charging vehicles 102. The vehicles 102, mobile devices 106, charger monitoring server 110, and charging station 104 of the system 100 may be configured to communicate over a communications network 108. The charger monitoring server 110 may be configured to receive charger histories 112 from the charging stations 104 and/or from the vehicles 102. Using the charger histories 112, and details of the vehicles 102, a charger service 114 hosted by the charger monitoring server 110 may be configured to generate charger statistics 116 that may be used to provide charger recommendations 122 to users of the vehicles 102 and/or the mobile devices 106.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be a battery electric vehicle (BEV) powered by a traction battery and one or more electric motors. As a further possibility, the vehicle 102 may be a hybrid electric vehicle powered by both an internal combustion engine, a traction battery, and one or more electric motors. Hybrid vehicles 102 may come in various forms, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs), globally unique identifiers (GUIDs), customer or fleet accounts, etc.

The charging stations 104 may be configured to direct and manage the transfer of energy between a power source and the vehicle 102. An external power source may provide direct current (DC) or alternating current (AC) electric power to the charging stations 104. The charging stations 104 may, in turn, have a charge connector for plugging into a respective charge port of the vehicle 102. The charge port may be any type of port configured to transfer power from the charging stations 104 to the vehicle 102. Alternatively, the charging stations 104 may be configured to transfer power using other approaches, such as a wireless inductive coupling. However connected, the charging stations 104 may include circuitry and controls to direct and manage the transfer of energy between the power source and the vehicle 102.

The mobile device 106 may be any of various types of portable computing device, such as cellular phones, tablet computers, smart watches, laptop computers, portable music players, or other devices having processing and communications capabilities. The mobile device 106 may include one or more processors configured to execute computer instructions, and a storage medium on which the computer-executable instructions and/or data may be maintained.

The mobile device 106 may further include various wireless transceivers, such as a BLUETOOTH or BLUETOOTH Low Energy (BLE) transceiver, as well as a transceiver for communication over the communications network 108. The communications network 108 may include one or more interconnected communication networks such as the Internet, a cable television distribution network, a satellite link network, a local area network, and a telephone network, as some non-limiting examples. The vehicle 102 may also include a telematics control unit (TCU). The TCU may include network hardware configured to facilitate communication between the vehicle 102 and other devices of the system 100. For example, the TCU may include or otherwise access a cellular modem configured to facilitate communication with the communications network 108.

The charger monitoring server 110 may be an example of a networked computing device that is accessible to the vehicles 102, charging stations 104, and/or mobile devices 106 over the communications network 108. The charger monitoring server 110 may be configured to receive charger histories 112 from the charging stations 104 over the charger monitoring server 110 (e.g., as part of a billing process for charging station 104 usage or as a separate process). In another example, vehicle 102 may monitor its charging station 104 usage, and may send its charger history 112 over the over the communications network 108 to the charger monitoring server 110.

The charger histories 112 may include information with respect to vehicle 102 usage of the charging stations 104. This information may include, as some non-limiting examples: a time at which a charging station 104 begins to charge a vehicle 102, a time at which a charging station 104 stops to charging the vehicle 102, average charge rate for the charge of the vehicle 102, charge over time rate for the charge of the vehicle 102, an identifier of the charging station 104, an identifier of the vehicle 102, whether an issue occurred during the charge of the vehicle 102, charge per kWh for the charge, etc. The charger histories 112 may also include information regarding the vehicles 102 that utilize the charging stations 104. For instance, the charger histories 112 may also include identifiers of the vehicles (e.g., VIN, GUID, user account, etc.), make, model, and/or type of the vehicle 102, age of the vehicle 102, battery health of the vehicle 102, mileage of the vehicle 102, initial charge level of the vehicle 102, ending charge level of the vehicle 102.

The charger service 114 may be an example of an application executed by the charger monitoring server 110. As explained in further detail herein, the charger service 114 may be configured to receive charger histories 112, generate charger statistics 116 based on the charger histories 112, and use those generated charger statistics 116 to reply to charger requests 120 with charger recommendations 122 tailored to the vehicle 102 to be charged.

The charger statistics 116 may include information related to the usage of charging stations 104 by the vehicles 102. These charger statistics 116 may include, for example, charge success percentage rates per charging station 104 plug, average charge rates per charging station 104 plug, charging rates, percentage of the times that the charging station 104 provides the advertised rages, rates per kWh incurred through use of the charging stations 104, etc. These charger statistics 116 may be computed overall per charging station 104 plug. Additionally, or alternately, these charger statistics 116 may be computed per charging station 104 plug per vehicle 102 make, model, type, or other vehicle 102 characteristics. This may allow for charger recommendations 122 to be formed that are tailored to the vehicle 102 make, model, type, or other vehicle 102 characteristics.

A charger application 118 may be installed to the vehicles 102 and/or to the mobile devices 106. Using the charger application 118 a user may send a charger request 120 to the charger service 114 to request that one or more charging stations 104 be recommended for charging a vehicle 102. The charger request 120 may include information such as an identifier of the vehicle 102, aspects of the vehicle 102 such as type, make, model, mileage, battery health, etc., as well as a location of the vehicle 102. Using the charger histories 112, the charger service 114 may determine a charger recommendation 122 for the vehicle 102 and provide that charger recommendation 122 to the requesting device.

As charger histories 112 are accumulated by the charger service 114, one or more of the charging stations 104 may be removed from display in the charger application 118 (e.g., by no longer being recommended in charger recommendations 122 from the charger service 114) or may otherwise indicate an issue in the charger application 118 for use of such a charging station 104. The charger application 118 may also suggest other more reliable or vehicle-appropriate charging stations 104 for use in charging the vehicle 102.

In another aspect, the charger service 114 may be configured to provide feedback provided to charging stations 104 to suggest reduced rates for problematic plugs or lower than advertised power and/or charge being provided by those charging stations 104.

In another aspect, success rates and other information may be provided by the charger service 114 as an input for routing of the vehicle 102, such as to determine where to charge during trips or during the day. For instance, charging stations 104 may be geofenced in a navigation application to avoid certain charging stations 104 and/or to prefer charging stations 104 having had successful outcomes. This may allow, for example a user to avoid charging stations 104 that advertise fast charging but do not provide it in practice. This may also allow the user to avoid charging stations 104 that have high incident rates and poor likelihood of achieving the desired charge to the vehicle 102.

In another aspect, the charger service 114 may allow for avoidance of expensive charging stations 104 or charging stations 104 that change rate based on time of day or other factors such as demand.

In another aspect, the charger service 114 may remove certain charging stations 104 or plugs from display or use by the charger application 118 (or offer alerts not to use them) and suggest other more reliable/honest charging stations to use.

In another aspect, the charger service 114 may compute charger ratings by averaging performance for key metrics/prices from all vehicles 102 that charge at each charging station 104. These computed charger ratings may also be specific to the type of vehicle 102, such that if a certain type of vehicle 102 does not charge as well at certain stations, these charging stations 104 can be avoided in the future for those specific vehicles 102.

Figure 2:
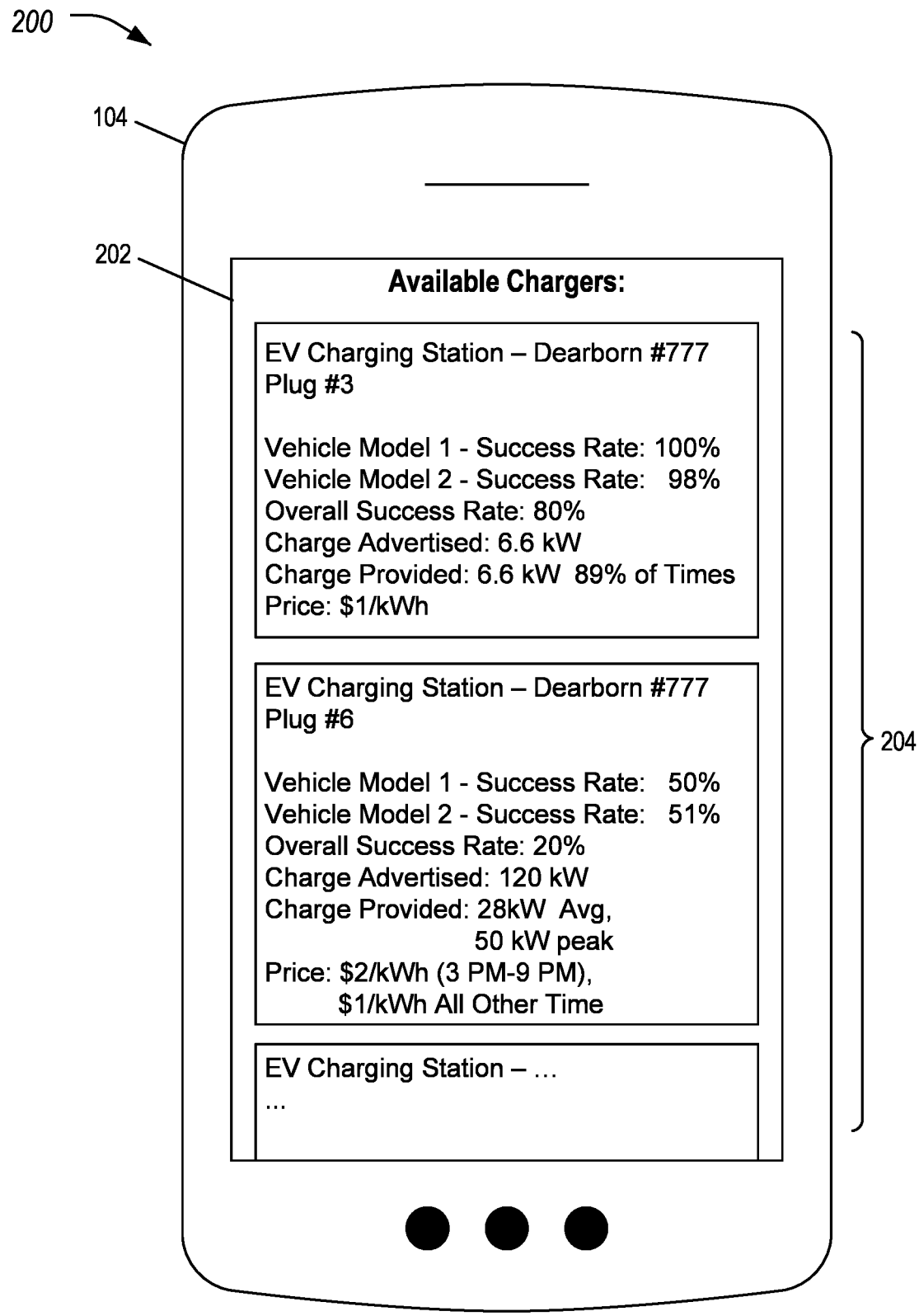
FIG. 2 illustrates an example of a user interface of the charger application showing a list of available charging stations.

FIG. 2 illustrates an example 200 of a user interface 202 of the charger application 118 showing a list of available charging stations 104. In an example, the user interface 202 may be shown on the mobile device 106 of a user responsive to the user sending a charger request 120 to the charger service 114 for a charging station 104. In another example, the user interface 202 may be shown as part of a navigation situation where the navigation using the charger application 118 to charger request 120 to identify possible charging stations 104 when constructing a route for the vehicle 102 to a destination. It should be noted that while the user interface 202 is shown as being provided on the mobile device 106, in other examples the user interface 202 may be provided on the human machine interface (HMI) of the vehicle 102 itself, such as via a navigation interface of the vehicle 102.

The user interface 202 may provide recommendation listings 204 of charging stations 104 for the vehicle 102 to use. These recommendation listings 204 may be based on the information provided by the charger service 114 in the charger recommendations 122. For instance, one or more charging stations 104 may be recommended by the charger service 114, and each of them may be provided in the recommendation listings 204.

As shown, a plurality of recommendation listings 204 are shown. Each charging station 104 is indicated by name and plug, as one charging station 104 may include multiple plugs, and these plugs may have different charger histories 112 and capabilities. The recommendation listings 204 may also include additional information based on the charger histories 112. This may include, for instance, charge success rates for different types of vehicles 102, an overall success rate for vehicles 102 using the plug, an advertised maximum charge rate for the charging station 104, an actual charge rate for the charging station 104, pricing information for the charging station 104, etc.

Figure 3:
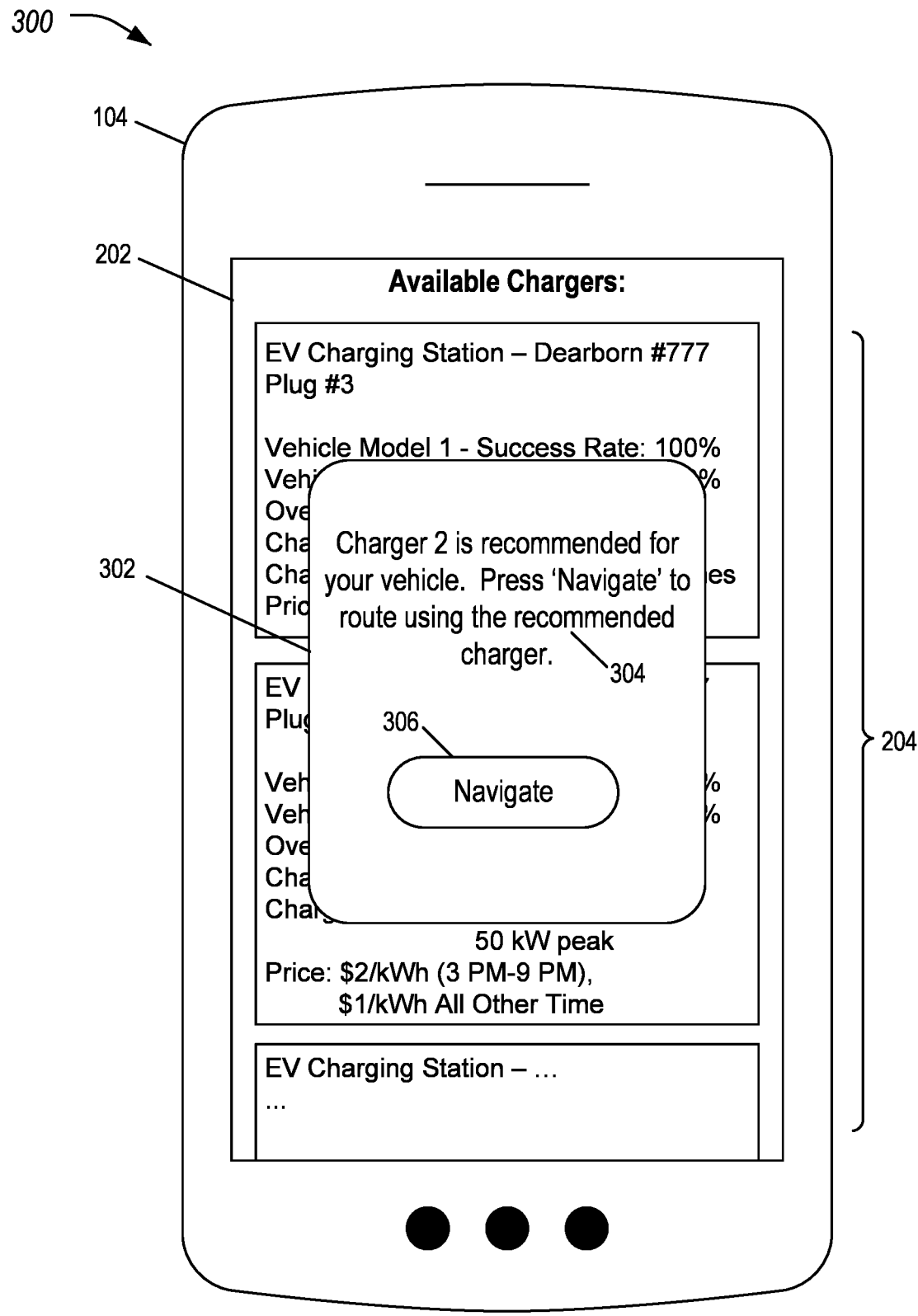
FIG. 3 illustrates an example of the user interface indicating a recommendation of a charging station for the vehicle.

FIG. 3 illustrates an example 300 of the user interface 202 indicating a recommendation 302 of a charging station 104 for the vehicle 102. As shown, the recommendation 302 includes a description 304 explaining which of the chargers is recommended for the vehicle 102. The recommendation 302 in this example also includes a navigate control 306 that, when selected, allows the recommended charging station 104 to be added to the routing of the vehicle 102.

Figure 4:
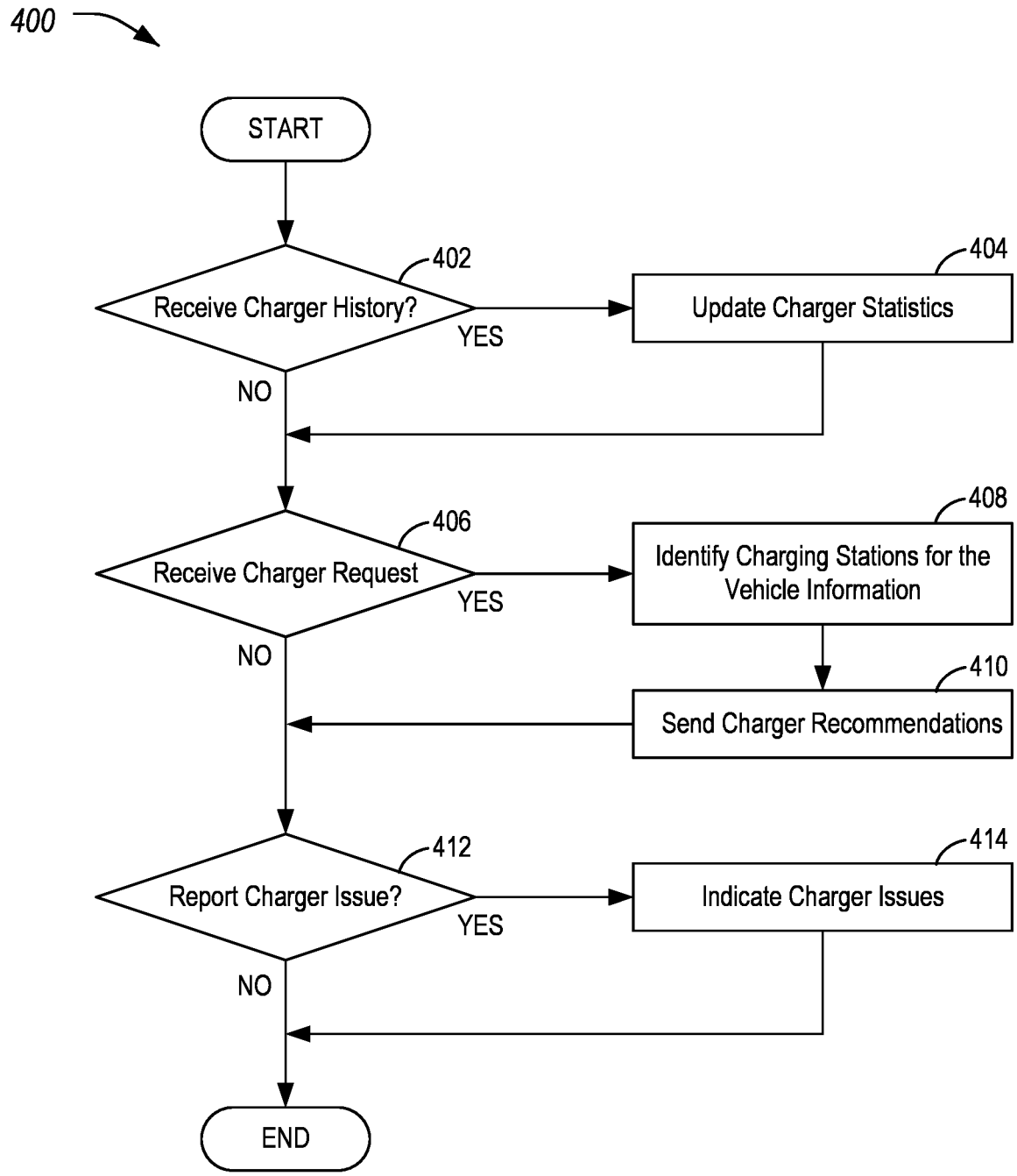
FIG. 4 illustrates an example process for determining charger recommendation for a vehicle.

FIG. 4 illustrates an example process 400 for determining charger recommendations 122 for a vehicle 102. In an example, the process 400 may be performed by the charger service 114 executed by the charger monitoring server 110 in the context of the system 100.

At operation 402, the charger service 114 determines whether one or more charger histories 112 have been received. In an example, the charger service 114 may receive charger histories 112 from one or more charging stations 104 monitoring the usage of the charging stations 104 by the vehicles 102. In another example, the charger service 114 may receive charger histories 112 from one or more vehicles 102 monitoring their usage of the services of the charging stations 104. The charger histories 112 may include information such as a time at which a charging station 104 begins to charge a vehicle 102, a time at which a charging station 104 stops to charging the vehicle 102, average charge rate for the charge of the vehicle 102, charge over time rate for the charge of the vehicle 102, an identifier of the charging station 104, an identifier of the vehicle 102, whether an issue occurred during the charge of the vehicle 102, charge per kWh for the charge, etc. The charger histories 112 may also include information regarding the vehicles 102 that utilize the charging stations 104. For instance, the charger histories 112 may also include identifiers of the vehicles (e.g., VIN, GUID, user account, etc.), make, model, and/or type of the vehicle 102, age of the vehicle 102, battery health of the vehicle 102, mileage of the vehicle 102, initial charge level of the vehicle 102, ending charge level of the vehicle 102. If such information is received, control passes to operation 404. If not, control continues to operation 406.

At operation 404, the charger service 114 uses the received charger histories 112 to update the charger statistics 116. For instance, the charger service 114 may compile charger statistic 116 related to the usage of charging stations 104 by the vehicles 102. These charger statistics 116 may include, for example, charge success percentage rates per charging station 104 plug, average charge rates per charging station 104 plug, charging rates, percentage of the times that the charging station 104 provides the advertised rages, rates per kWh incurred through use of the charging stations 104, etc. These charger statistics 116 may be computed overall per charging station 104 plug. Additionally, or alternately, these charger statistics 116 may be computed per charging station 104 plug per vehicle 102 make, model, type, or other vehicle 102 characteristics. This may allow for charger recommendations 122 to be formed that are tailored to the vehicle 102 make, model, type, or other vehicle 102 characteristics.

At operation 406, the charger service 114 determines whether a charger request 120 is received. In an example, using the charger application 118 executed by a vehicle 102 and/or by a mobile device 106 of a user, the user may send a charger request 120 to the charger service 114 to request that one or more charging stations 104 be recommended for charging a vehicle 102. The charger request 120 may include information such as an identifier of the vehicle 102, aspects of the vehicle 102 such as type, make, model, mileage, battery health, etc., as well as a location of the vehicle 102. This charger request 120 may be received by the charger service 114. If a charger request 120 is received, control passes to operation 408. If not control proceeds to operation 410.

At operation 408, the charger service 114 identifies one or more charging stations 104 responsive to the charger request 120. In an example, the charger service 114 may utilize the information from the charger request 120 to locate charging stations 104 within proximity to the location of the vehicle 102 as indicated by the charger request 120.

Additionally, the charger service 114 may tailor the located charging stations 104 based on additional information include in the charger request 120. For instance, the charger service 114 may identify which of the charging stations 104 have the highest charge rate, reliability, etc. for the specific make, model, type, etc. of the vehicle 102. This may improve the charger recommendation 122 to select charging stations 104 that historically work the best for the specific make, model, type, etc. of the vehicle 102 that is requesting a charge. As another example, this may provide charger recommendations 122 that are best for a vehicle 102 with poor battery health. As yet another example, this may provide charger recommendations 122 that are best for a vehicle 102 that is high mileage.

Information about these charging stations 104 may be added to a charger recommendation 122. The charger recommendation 122 may be sent to the vehicle 102 or mobile device 106 that sent the charger request 120 at operation 406. These charger recommendations 122 may be utilized by the requester. In some examples, the charger service 114 may also rank the located charging stations 104 using one or more factors such as distance from the vehicle 102, highest charge rate, highest reliability. This may allow a recipient of the charger recommendation 122 to determine a best charger recommendation 122 for the vehicle 102.

At operation 410, the charger service 114 determines whether there is an issue with one or more of the charging stations 104 to report. For instance, if the updated charger statistics 116 computed at operation 404 indicate that a charging station 104 has become slower and/or has a higher percentage of interrupted charge attempts as compared to its earlier charger statistics 116, then that may indicate that an issue has occurred with that charging station 104. This may allow the charger service 114 to identify issues about degraded charging station 104 performance that may be difficult for an operator of a charging station 104 to identify. If such an issue is identifier, control passes to operation 412. If not, the process 400 ends.

At operation 412, the charger service 114 notifies the charging station 104 of the identified issue. In an example, the charging station 104 may be connected to the communications network 108 and the charger service 114 may send the charging station 104 a message over the communications network 108 indicating the issue. This message may, in an example, be displayed by the charging station 104 plug having difficulties, to allow users to know that there is an issue with that charging station 104. This message may also be used by the operator of the charging station 104 to dispatch a repair crew to address the issue with the charging station 104. After operation 412, the process 400 ends.

Figure 5:
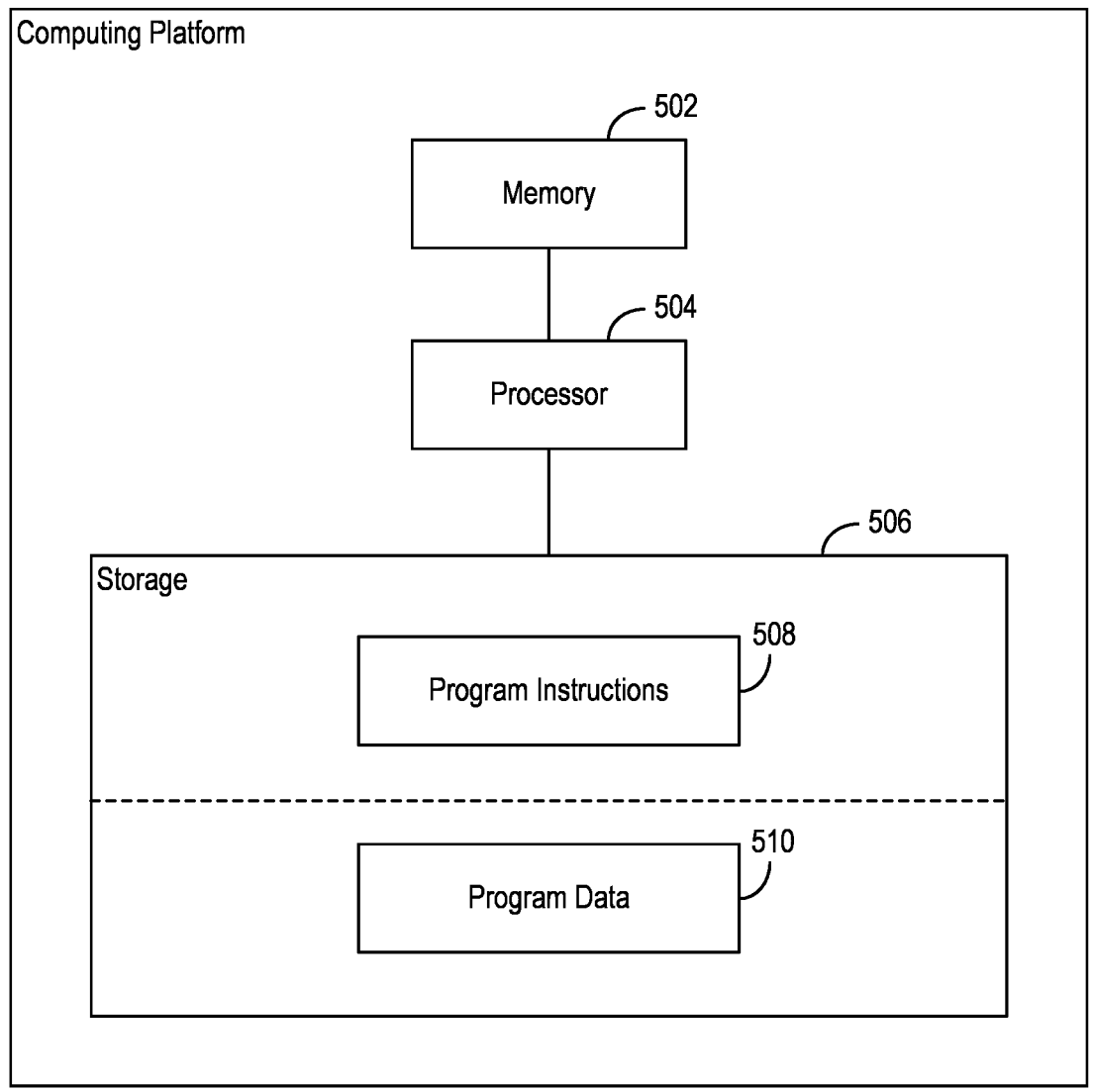
FIG. 5 illustrates an example computing device for success rate and usage monitoring for charging vehicles.

Variations on the process 400 are possible. In an example, the charger service 114 may compute the charger statistics 116 for the vehicle 102 dynamically responsive to receipt of the charger request 120. In another example, the vehicle 102 may maintain charger history 112 information and may determine the charger recommendations 122 locally. In FIG. 5 illustrates an example computing device 502 for tracking a non-reputable vehicle change history. Referring to FIG. 5, and with reference to FIGS. 1-4, the vehicles 102, charging stations 104, mobile devices 106, communications network 108, and charger monitoring servers 110 may include examples of such computing devices 502. Computing devices 502 generally include computer-executable instructions, such as those of the charger service 114, where the instructions may be executable by one or more computing devices 502. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the charger histories 112, charger requests 120, and charger recommendations 122, may be stored and transmitted using a variety of computer-readable media.

As shown, the computing device 502 may include a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 504 executes stored program instructions that are retrieved from the storage 506. The stored program instructions, accordingly, include software that controls the operation of the processors 504 to perform the operations described herein. The storage 506 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices 512 that receive human interface inputs may include keyboards, mice, trackballs, touchscreens, microphones, graphics tablets, and the like.

The network devices 508 may each include any of various devices that enable the described components to send and/or receive data from external devices over networks. Examples of suitable network devices 508 include an Ethernet interface, a Wi-Fi transceiver, a cellular transceiver, or a BLUETOOTH or BLE transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for success rate and usage monitoring for vehicle charging, comprising:
   a processor;
   one or more vehicles, each configured to transmit, to the processor, monitored charging station usage of the respective vehicle as charger histories of the respective vehicle;
   one or more charging stations, wherein each charging station is configured to transmit, to the processor, the charger histories of the one or more vehicles that used the charging station and wherein each charging station is configured to receive messages from the processor;
   a storage database configured to maintain the charger histories descriptive of vehicle charges performed to the one or more vehicles by the one or more charging stations and further including information descriptive of the one or more vehicles receiving the vehicle charges, the charger histories having been received from the one or more vehicles; and
   a communications network enabling connection between the processor, the one or more vehicles, the one or more charging stations, and the storage database;
   wherein the processor, is programmed to
      receive a charger request from a requesting device, the charger request requesting recommendations of at least one charging station of the one or more charging stations for a requesting vehicle of the one or more vehicles,
      identify one or more vehicle attributes from the charger request, determine the charging station recommendations based on charger statistics computed based on the charger histories that correspond to the one or more vehicle attributes, send the charging station recommendations corresponding to the one or more vehicle attributes to the requesting device and display the charging station recommendations in a user interface of the requesting device, responsive to the request, receive additional charger histories transmitted from the one or more vehicles, the additional charger histories including additional information descriptive of additional vehicle charges performed to the one or more vehicles by the one or more charging stations and descriptive of the one or more vehicles receiving the additional vehicle charges, the additional charger histories including data indicative of a change performed to the requesting vehicle based on the charger recommendations;

update the charger statistics based on the additional charger histories for use in handling further charger requests;

send a message to at least one charging station of the one or more charging stations, via the communications network, based on the updated charger statistics;

receive a second charger request from a second requesting device, the second charger request requesting second charging station recommendations for a second requesting vehicle of the one or more vehicles;

identify one or more second vehicle attributes from the second charger request;

determine the second charging station recommendations based on the charger statistics as updated, based on the charger histories that correspond to the one or more second vehicle attributes; and send the second charging station recommendations corresponding to the one or more vehicle attributes to the second requesting device and display the second charging station recommendations in a user interface of the second requesting device, responsive to the second charger request.

2. The system of claim 1, wherein at least a portion of the additional charger histories are received from the one or more charging stations.

3. The system of claim 1, wherein the processor is further programmed to:

determine based on the charger statistics, that one of the charging stations has changed in one or more of one or more of charger success rate or average energy transfer rate; and inform the one of the charging stations of the change.

4. The system of claim 1, wherein the one or more vehicle attributes include vehicle model, and the charger statistics include one or more of charger success rate for the vehicle model and average energy transfer rate for the vehicle model.

5. The system of claim 1, wherein the requesting device is one of the one or more vehicles.

6. The system of claim 1, wherein the requesting device is a smartphone.

7. The system of claim 1, wherein the one or more vehicle attributes are specified in the charger request.

8. The system of claim 1, wherein the one or more vehicle attributes include one or more of make, model, type, age, battery health, or mileage of the vehicle.

9. A method for success rate and usage monitoring for vehicle charging, comprising:

transmitting, by each vehicle of one or more vehicles to a processor over a communications network, monitored charging station usage of the vehicle as charger histories of the vehicle;

transmitting, by each charging station of one or more charging stations to the processor over the communications network, the charger histories of each of the vehicles that used the charging station;

storing, by the processor, the charger histories, wherein the charger histories are descriptive of vehicle charges performed to the one or more vehicles by the one or more charging stations and further including information descriptive of the one or more vehicles receiving the vehicle charges;

receiving, by the processor, a charger request from a requesting device, the charger request requesting recommendations of the at least one charging station of the one or more charging stations for a requesting vehicle;

identifying, by the processor, one or more vehicle attributes from the charger request;

determining, by the processor, the charging station recommendations based on charger statistics computed based on charger histories that correspond to the one or more vehicle attributes;

sending, by the processor, the charging station recommendations corresponding to the one or more vehicle attributes to the requesting device and displaying the charger recommendations in a user interface of the requesting device, responsive to the request;

receiving, by the processor, additional charger histories transmitted from the one or more vehicles, the additional charger histories including additional information descriptive of additional vehicle charges performed to the one or more vehicles by the one or more charging stations and descriptive of the one or more vehicles receiving the additional vehicle charges, the additional charger histories including data indicative of a charge performed to the requesting vehicle based on the charger recommendations;

updating, by the processor, the charger statistics based on the additional charger histories for use in handling further charger request;

sending, by the processor, a message to at least one charging station of the one or more charging stations, via the communications network, based on the updated charger statistics;

receiving, by the processor, a second charger request from a second requesting device, the second charger request requesting second charger recommendations for a second requesting vehicle of the one or more vehicles;

identifying, by the processor, one or more second vehicle attributes from the second charger request;

determining, by the processor, the second charging station recommendations based on the charger statistics as updated, based on the charger histories that correspond to the one or more second vehicle attributes; and sending, by the processor, the second charging station recommendations corresponding to the one or more vehicle attributes to the second requesting device and displaying the second charging station recommendations in a user interface of the second requestion device, responsive to the second charger request.

10. The method of claim 9, further comprising:
determining based on the charger statistics, that one of the charging stations has changed in one or more of one or more of charger success rate or average energy transfer rate; and
informing the one of the charging stations of the change.

11. The method of claim 9, wherein the one or more vehicle attributes include vehicle model, and the charger statistics include one or more of charger success rate for the vehicle model and average energy transfer rate for the vehicle model.

12. The method of claim 9, further comprising displaying the charger recommendations by the requesting device.

13. The method of claim 12, further comprising displaying a recommendation indicating a recommended charging station of the charger recommendations and a navigate control that, when selected, adds the recommended charging station to the routing of the requesting vehicle.

14. The method of claim 9, further comprising navigating to a charging station included in the charger recommendations.

15. A non-transitory computer-readable medium comprising instructions for success rate and usage monitoring for vehicle charging that, when executed by a processor of a charger monitoring server, cause the charger monitoring server to perform operations including to:
transmit, by each vehicle of one or more vehicles to a processor over a communications network, monitored charging station usage of the vehicle as charger histories of the vehicle;
transmit, by each charging station of one or more charging stations to the processor over the communications network, the charger histories of each of the vehicles that used the charging station;
store, by the processor, the charger histories, wherein the charger histories are descriptive of vehicle charges performed to the one or more vehicles by the one or more charging stations and further including information descriptive of the one or more vehicles receiving the vehicle charges;
receive a charger request from a requesting device, the charger request requesting recommendations of at least one charging station of the one or more charging stations for a requesting vehicle;
identify one or more vehicle attributes from the charger request;
determine the charging station recommendations based on charger statistics computed based on charger histories that correspond to the one or more vehicle attributes;
send the charging station recommendations corresponding to the one or more vehicle attributes to the requesting device and displaying the charger recommendations in a user interface of the requesting device, responsive to the request,
receive additional charger histories transmitted from the one or more vehicles, the additional charger histories including additional information descriptive of additional vehicle charges performed to the one or more vehicles by the one or more charging stations and descriptive of the one or more vehicles receiving the additional vehicle charges, the additional charger histories including data indicative of a charge performed to the requesting vehicle based on the charger recommendations;
update the charger statistics based on the additional charger histories for use in handling further charger requests;
sending a message to at least one charging station of the one or more charging stations, via the communications network, based on the updated charger statistics;
receive a second charger request from a second requesting device, the second charger request requesting second charger recommendations for a second requesting vehicle of the one or more vehicles;
identify one or more second vehicle attributes from the second charger request;
determine the second charging station recommendations based on the charger statistics as updated, based on the charger histories that correspond to the one or more second vehicle attributes; and
send the second charging station recommendations corresponding to the one or more vehicle attributes to the second requesting device and displaying the second charging station recommendations in a user interface of the second requesting device, responsive to the second charger request.

16. The medium of claim 15, further comprising:
determining based on the charger statistics, that one of the charging stations has changed in one or more of one or more of charger success rate or average energy transfer rate; and
informing the one of the charging stations of the change.

17. The medium of claim 15, wherein the one or more vehicle attributes include vehicle model, and the charger statistics include one or more of charger success rate for the vehicle model and average energy transfer rate for the vehicle model.

18. The medium of claim 15, further comprising displaying the charger recommendations by the requesting device.

19. The medium of claim 15, further comprising navigating to a charging station included in the charger recommendations.

* * * * *